July 3, 1962  C. AKMENTIN  3,042,420
SKI SLED

Filed Aug. 18, 1960  2 Sheets-Sheet 1

Cyril Akmentin
INVENTOR.

BY Clarence A.O'Brien
and Harvey B. Jacobson
Attorneys

July 3, 1962
C. AKMENTIN
3,042,420
SKI SLED
Filed Aug. 18, 1960
2 Sheets-Sheet 2
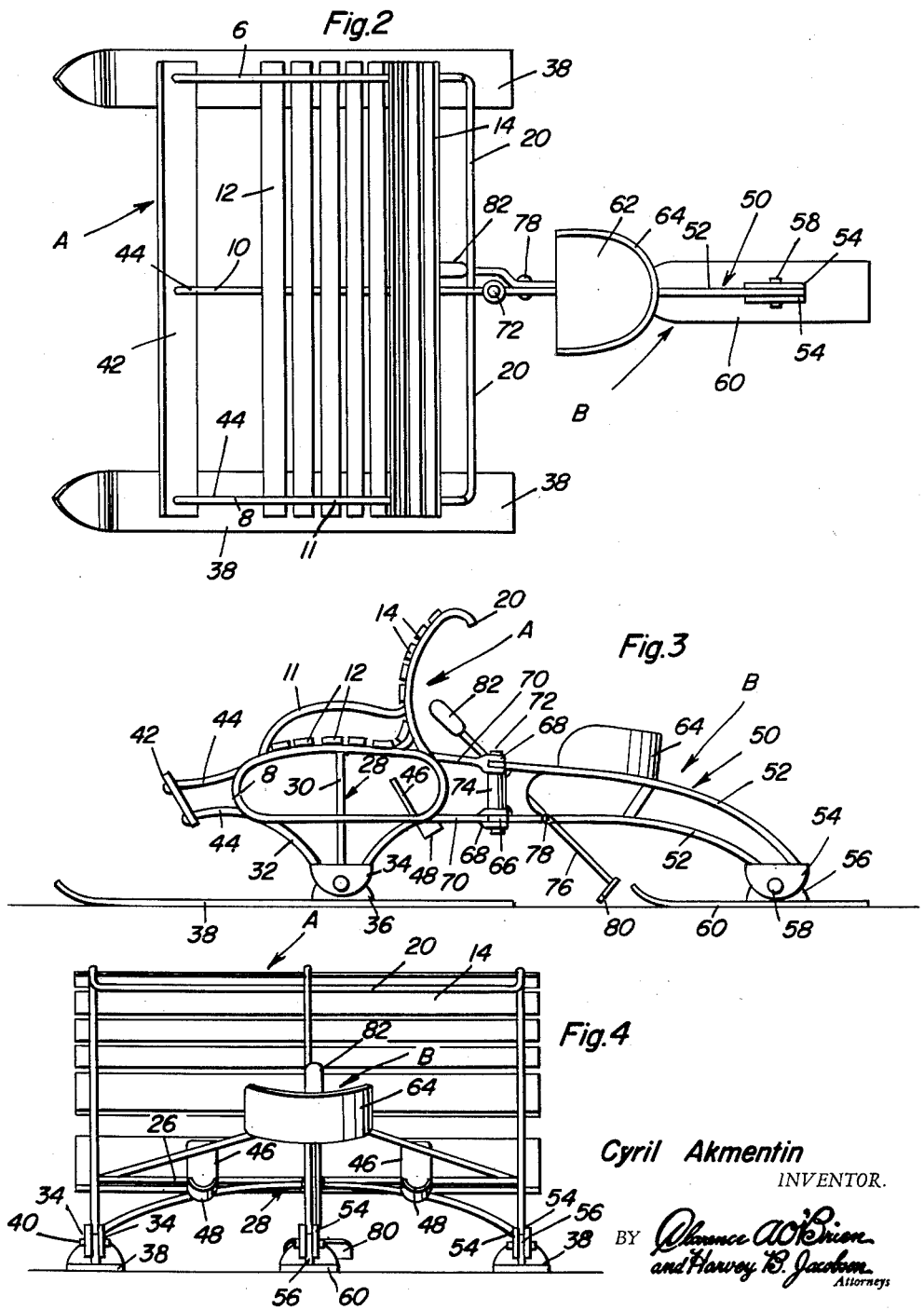
Cyril Akmentin
INVENTOR.

United States Patent Office 3,042,420
Patented July 3, 1962

3,042,420
SKI SLED
Cyril Akmentin, 136 Minnechang Drive,
Glastonbury, Conn.
Filed Aug. 18, 1960, Ser. No. 50,519
5 Claims. (Cl. 280—16)

The present invention relates to certain new and useful improvements in a sled, and the general object is to structurally, functionally and in other ways improve upon similarly constructed and performing sleds wherein a plurality of riders or passengers are accommodated and reliable steering means is provided.

One improvement has to do with a chassis provided with interchangeable readily applicable and removable skis constituting runners, said chassis having a bench or equivalent means thereon to accommodate one or more passengers.

Stated otherwise, a novelly constructed frame supports a bench and carries detachable skis serving as runners. The back of the bench is provided with a reliable handle bar to assist in steering. Foot plates, treadles or the like are suitably mounted at the center of the back of the chassis to cooperate with the handle bar. A foot rail for the passengers is provided at the front.

Another improvement resides in a simple and expedient component or part which constitutes a trailer or trailer means. This means is characterized by a detachable ski serving as a runner. A pivoted hand brake is also provided, a seat for the occupant or operator and means is utilized to hingedly join the leading end of the trailer means with the central trailing portion of the chassis.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a plan view on a smaller scale.

FIG. 3 is a side elevational view looking at the left side of the structure as an entity.

FIG. 4 is a rear view, that is, a view looking at the other figures in a direction from right to left in the drawings.

Figure 1:
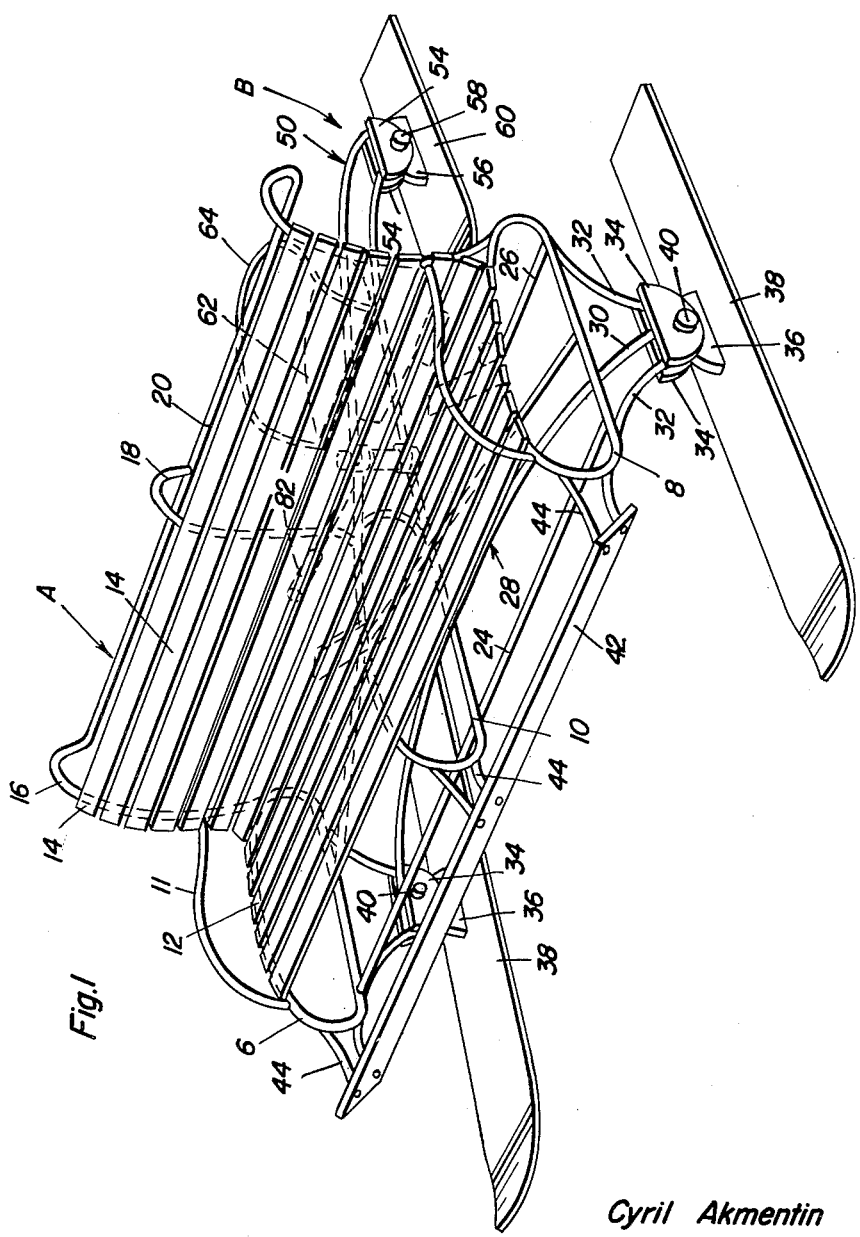
FIG. 1 is a view in perspective of a ski-equipped sled embodying the present invention.

Referring now to the drawings in detail, the forward part or section of the over-all structure is denoted generally by the reference character A and the companion rearward or trailer means is denoted generally by the reference character B, and A and B are separably and hingedly joined together in the relationship depicted in the views of the drawings.

With further reference to the part or section A this is more specifically referred as a runner supported seat-equipped chassis. The "chassis" may take the form of a suitable one-piece frame structure characterized by a pair of ovate transversely disposed end frames 6 and 8 and an intermediate or intervening similarly shaped center frame 10. The end frames 6 and 8 are provided with upstanding suitably constructed handles 11 and the several frames together, 6, 8 and 10, support appropriately constructed and attached slats 12 forming a seat. Similar slats 14 are attached to the upstanding frame members 16 and constitute a backrest as illustrated. The depending portions 18 support a horizontal connecting member 20 which constitutes a handle bar for control and steering as will be later described. The frames 6, 8 and 10 are joined and reinforced by tie rods or rails 24 and 26. Also extending longitudinally is a bowed truss 28 which is rigidly incorporated in the over-all chassis frame and has downturned end members 30 located between depending legs 32 carrying semi-circular cleats or plates 34 straddling upstanding semi-circular lugs 36 on the central parts of the cooperating skiis or runners 38. The components 34 and 36 are separably and hingedly joined by a pivot pin 40 which is constructed (not detailed) for ready insertion and removal. The footrest or foot board 42 which extends lengthwise across the front of the bench or seat is joined to the chassis frames 6, 8, and 10 by way of suitable connecting arms 44. Thus it will be seen that a unique frame provides a suitable chassis with facilities defining a sled-like bench for one or more passengers or riders. With further reference to the rear central portion of the chassis frame it will be noticed that oblique angled foot plates or treadles are provided. Each includes an appropriately mounted plate 46 having a heel rest 48.

The trailer or trailing means B comprises a general V-shaped frame 50 having upper and lower frame members 52 connected at their rear ends to a pair of spaced apart semi-circular plates 54 straddling a complemental lug 56 and separably and hingedly connected thereto by way of a pivot pin 58. The lug is mounted on the central upper side of the trailing and steering ski or runner 60. The seat (FIG. 2) for the operator or controller is denoted at 62 and is appropriately mounted on the frame 50 and has a rim 64. Eyes 66 are provided on the forward ends of the frame members and fit into forks 68 carried on the trailing ends of upper and lower arms 70 provided on the center frame 10. An insertable and removable hinge pin 72 cooperates with the forks and eyes and the spacer 74 and provides a satisfactory separable hinge joint between the unit or chassis A and the trailing means B.

The only other component to be mentioned is the brake means. This comprises a simple lever 76 hinged on the frame 50 as at 78, having a brake shoe 80 at the lower end and a conveniently arranged and accessible handle or hand-grip 82 on the upper end. This handle and lever is within convenient reach of the occupant of the seat 62. Thus the occupant of the seat controls the action of the over-all conveyance and has access to the simple brake, has means for supporting his feet as at 46 and 48 and also has the handle bar 20 at his convenient and controllable disposition.

It is reiterated that the conveyance herein disclosed, described and claimed constitutes a unique conveyance for use on snow-covered and equivalent surfaces. The two front runners are identical as at 38 and are interchangeable and are readily applied and removed by way of the component connecting elements, the cleats 34, lug 36 and hinge pin 40. By taking these runners off, the entire front section or bench-equipped chassis may be loaded and carried in a conventional station wagon. For greater convenience the trailer unit B may be removed by way of the central hinge means 72. It will be evident, under these circumstances that this simple mechanical conveyance is indeed an innovation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. A sled comprising a passenger accommodating chassis embodying a frame construction having depending legs provided with spaced parallel cleats, skis constituting runners, said skis having centralized upstanding lugs and said lugs being separably and hingedly mounted between their respective cleats, said frame construction having horizontal and vertical slats conjointly providing a seat and a backrest constituting an elongated bench, said frame construction also being provided at the front thereof with outstanding arms connected to a horizontal member constituting a foot board, a trailing ski pivotally connected to the rear of the frame structure for lateral swinging movement, and a seat on said trailing ski, said frame being provided at the back thereof with a handle bar and beneath the handle bar with foot treadles for receiving the hands and feet, respectively, of an occupant of the last-named seat for steering the sled.

2. A sled comprising a bench including end legs, skis rockably mounted on said end legs, a frame pivotally connected to the bench for lateral swinging movement and extending rearwardly from said bench, a ski rockably mounted on said frame, a seat mounted on the frame, foot treadles mounted on the rear of the bench on opposite sides of the frame, and a handle on the back of the bench above the frame, said handle and foot treadles receiving the hands and feet of an occupant of the seat for steering the sled.

3. A sled comprising a bench structure including end and intermediate frames and slats secured thereon, said end frames comprising depending legs, skis rockably mounted on said legs, rearwardly extending arms on the intermediate frame, an elongated trailer frame pivotally connected at one end to the arms for lateral swinging movement, a ski rockably mounted on the free end of the trailer frame, a seat mounted on said trailer frame, foot treadles on the bench structure on opposite sides of the arms, and an elongated transverse handle on the rear portion of the bench structure above the arms, said handle and foot treadles receiving the hands and feet of an occupant of the seat for steering the sled.

4. A sled in accordance with claim 3, wherein said bench structure further includes arms projecting forwardly from the end and intermediate frames, and a foot rail mounted on the last-named arms.

5. A conveyance of the class described comprising a pair of duplicate spaced parallel coplanar skis constituting sled runners and provided intermediate their upper portions with upstanding attaching lugs, a chassis spanning the space between the skis and having seat means and depending leg means, the leg means provided with plates straddling and separably and hingedly connected to their respective lugs, a third ski trailing the rear ends of the first-named skis and situated behind and between the positions of the left and right skis and also constituting a runner, a seat-equipped frame having frame members provided with trailing cleats separably and hingedly connected to the last-named ski, said frame being provided with a seat, and means connecting said frame with said chassis, the last-named means comprising a pair of upper and lower aligned rigid arms fixedly mounted on the chassis and extending rearwardly therefrom, forks on the ends of said arms, eyes on the leading ends of the frame members separably and hingedly joined to the forks, and a lever pivotally mounted intermediate its ends on one of the frame members and provided with a brake foot at the bottom and a handgrip at the top.

References Cited in the file of this patent

UNITED STATES PATENTS

| | | |
|---|---|---|
| 179,832 | Weigand et al. | July 11, 1876 |
| 535,851 | Olson | Mar. 19, 1895 |
| 1,667,436 | Rainey | Apr. 24, 1928 |

FOREIGN PATENTS

| | | |
|---|---|---|
| 9,525 | Sweden | Jan. 21, 1899 |
| 41,565 | Norway | June 29, 1925 |
| 164,327 | Austria | Oct. 25, 1949 |
| 207,925 | Germany | Mar. 15, 1909 |
| 675,234 | France | Oct. 29, 1929 |
| 816,696 | France | May 10, 1937 |
| 842,125 | France | Feb. 27, 1939 |